(12) United States Patent
Liedmeyer et al.

(10) Patent No.: US 7,661,750 B2
(45) Date of Patent: Feb. 16, 2010

(54) BOW FOR A CONVERTIBLE VEHICLE

(75) Inventors: Petra Liedmeyer, Recke (DE); Mark Wesselmann, Recke (DE)

(73) Assignee: Wilhelm Karmann GmbH, Osnabrück (DE)

( * ) Notice: Subject to any disclaimer, the term of this patent is extended or adjusted under 35 U.S.C. 154(b) by 62 days.

(21) Appl. No.: 10/577,082

(22) PCT Filed: Oct. 8, 2004

(86) PCT No.: PCT/DE2004/002238

§ 371 (c)(1), (2), (4) Date: Apr. 2, 2007

(87) PCT Pub. No.: WO2005/039908

PCT Pub. Date: Jun. 5, 2005

(65) Prior Publication Data

US 2008/0036236 A1 Feb. 14, 2008

(30) Foreign Application Priority Data

Oct. 24, 2003 (DE) .............................. 103 49 822

(51) Int. Cl.
*B60J 7/00* (2006.01)
(52) U.S. Cl. .............................. 296/107.11; 296/107.09
(58) Field of Classification Search ............ 296/107.11, 296/107.16, 117, 107.01, 104
See application file for complete search history.

(56) References Cited

U.S. PATENT DOCUMENTS

| 2,768,857 | A | * | 10/1956 | Albrecht | 296/117 |
| 3,096,117 | A | * | 7/1963 | Hallenbeck | 296/107.07 |
| 4,075,723 | A | * | 2/1978 | Bareis et al. | 114/361 |
| 4,487,447 | A | * | 12/1984 | Schroder | 296/108 |
| 4,573,732 | A | * | 3/1986 | Muscat | 296/108 |
| 4,746,163 | A | * | 5/1988 | Muscat | 296/107.11 |
| 4,991,902 | A | * | 2/1991 | Schrader et al. | 296/107.09 |
| 5,004,291 | A | * | 4/1991 | Bauer et al. | 296/116 |
| 5,427,429 | A | * | 6/1995 | Piontek et al. | 296/118 |
| 5,449,032 | A | * | 9/1995 | Blevins et al. | 296/214 |
| 5,487,584 | A | * | 1/1996 | Jespersen | 296/100.18 |
| 5,540,476 | A | * | 7/1996 | Cowsert | 296/107.11 |
| 5,664,824 | A | * | 9/1997 | Stephens et al. | 296/104 |
| 5,755,467 | A | * | 5/1998 | Dilluvio et al. | 292/32 |

(Continued)

FOREIGN PATENT DOCUMENTS

DE 31 27 524 1/1983

(Continued)

*Primary Examiner*—Kiran B. Patel
(74) *Attorney, Agent, or Firm*—Friedrich Kueffner

(57) ABSTRACT

The invention relates to a convertible vehicle (1) comprising a roof (2) provided with a flexible roof covering (4) in at least certain areas, said roof covering being gripped from below by one or several bows (6, 7) which are arranged in a transversal manner in relation to the direction of travel (F). At least one bow (6;7) is made of several pieces and comprises a central area (9) which is connected to lateral fittings (10) and is configured in such a manner that securing means are provided (16) in order to connect the central part (9) and the fittings (10). When the roof is closed, said securing means are arranged in the region of the respective bow (6, 7) and are at least approximately parallel to the extension plane (17;18) of the external roof covering (4).

9 Claims, 3 Drawing Sheets

U.S. PATENT DOCUMENTS

| | | | | |
|---|---|---|---|---|
| 5,829,820 A * | 11/1998 | Cowsert | ................ | 296/107.11 |
| 5,857,736 A * | 1/1999 | Feathers | ..................... | 296/214 |
| 5,873,210 A * | 2/1999 | Brumleve | .................. | 296/104 |
| 5,884,964 A * | 3/1999 | Roeper et al. | ............... | 296/118 |
| 6,039,382 A * | 3/2000 | Mather et al. | ........... | 296/107.01 |
| 6,068,326 A * | 5/2000 | Shiromura | ............. | 296/107.16 |
| 6,237,986 B1 * | 5/2001 | Neubrand et al. | ...... | 296/107.01 |
| 6,282,791 B1 * | 9/2001 | Patelczyk | .................... | 296/118 |
| 6,325,446 B1 * | 12/2001 | Wuellrich et al. | ...... | 296/107.12 |
| 6,361,100 B1 * | 3/2002 | Koester | ................. | 296/100.18 |
| 6,416,111 B1 * | 7/2002 | Neubrand | ................... | 296/117 |
| 6,550,842 B1 * | 4/2003 | Halbweiss et al. | .......... | 296/116 |
| 6,550,843 B2 * | 4/2003 | Patelczyk | .................... | 296/118 |
| 6,695,385 B1 * | 2/2004 | Lange | .................. | 296/107.12 |
| 6,832,805 B2 * | 12/2004 | Quindt et al. | .......... | 296/107.08 |
| 6,843,522 B2 * | 1/2005 | Lange | .................. | 296/107.09 |
| 6,957,842 B1 * | 10/2005 | Garska | ................. | 296/107.12 |
| 7,032,951 B2 * | 4/2006 | Powell | ................. | 296/107.01 |
| 7,118,160 B2 * | 10/2006 | Willard | ................. | 296/107.01 |
| 7,125,065 B2 * | 10/2006 | Haberl et al. | .......... | 296/107.08 |
| 7,144,063 B2 * | 12/2006 | Garska | ................. | 296/107.11 |
| 7,172,242 B2 * | 2/2007 | Heselhaus | ................... | 296/219 |
| 7,246,841 B2 * | 7/2007 | Dilluvio | ................ | 296/107.09 |
| 7,275,783 B2 * | 10/2007 | Dilluvio | ................ | 296/107.09 |
| 7,323,885 B2 * | 1/2008 | Gutendorf | ................... | 324/663 |
| 7,334,831 B2 * | 2/2008 | Wezyk et al. | .......... | 296/107.09 |
| 7,380,863 B2 * | 6/2008 | Garska | ................... | 296/107.12 |
| 2006/0061129 A1 * | 3/2006 | Dilluvio | ................ | 296/107.09 |
| 2006/0097542 A1 * | 5/2006 | Dilluvio | ................ | 296/107.09 |
| 2007/0063533 A1 * | 3/2007 | Zehnder et al. | ............. | 296/118 |
| 2007/0069546 A1 * | 3/2007 | Baum et al. | ............ | 296/107.01 |
| 2007/0170749 A1 * | 7/2007 | Just | ............. | 296/121 |
| 2007/0182199 A1 * | 8/2007 | Just | ...................... | 296/107.01 |
| 2007/0194595 A1 * | 8/2007 | Papendorf | ............. | 296/107.01 |
| 2007/0284909 A1 * | 12/2007 | Dilluvio | ................ | 296/107.01 |

FOREIGN PATENT DOCUMENTS

| | | |
|---|---|---|
| DE | 197 07 019 | 10/1997 |
| DE | 199 62 377 | 7/2001 |
| EP | 0 806 313 | 11/1997 |
| GB | 396 471 | 8/1933 |
| WO | 01/85478 | 11/2001 |

* cited by examiner

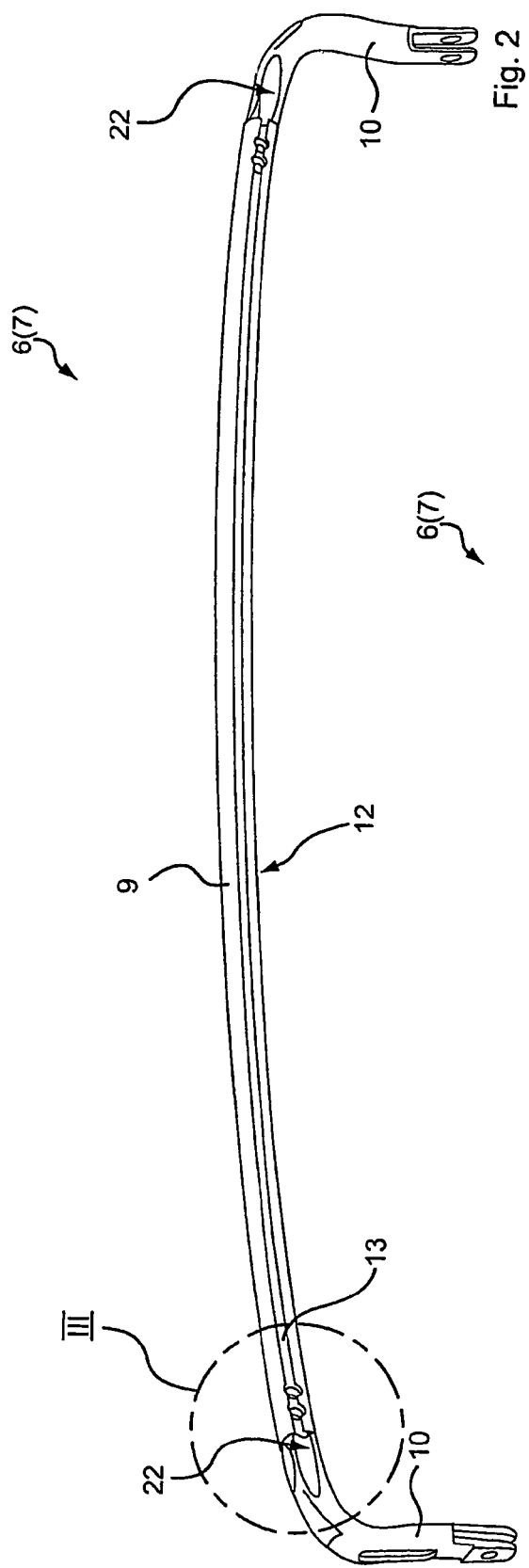
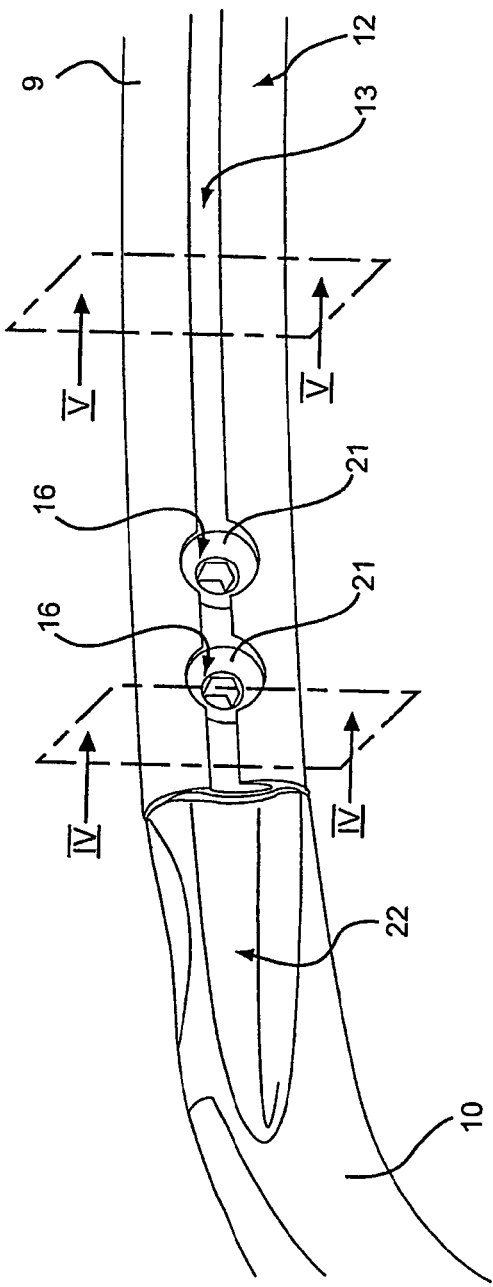

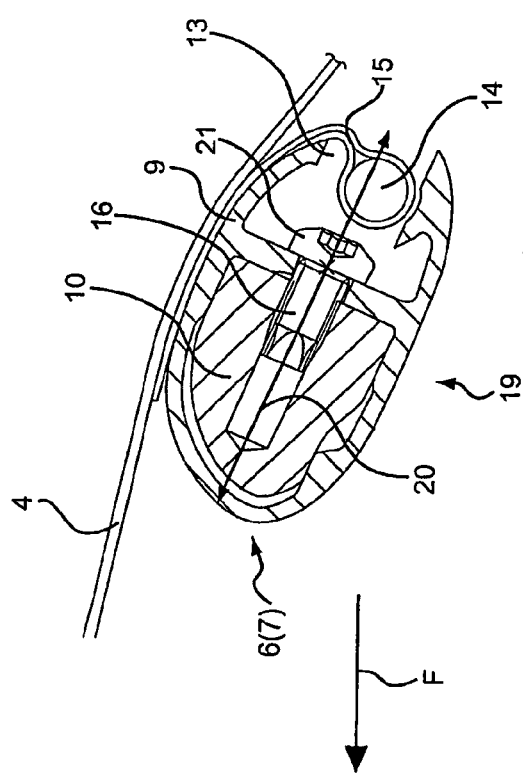
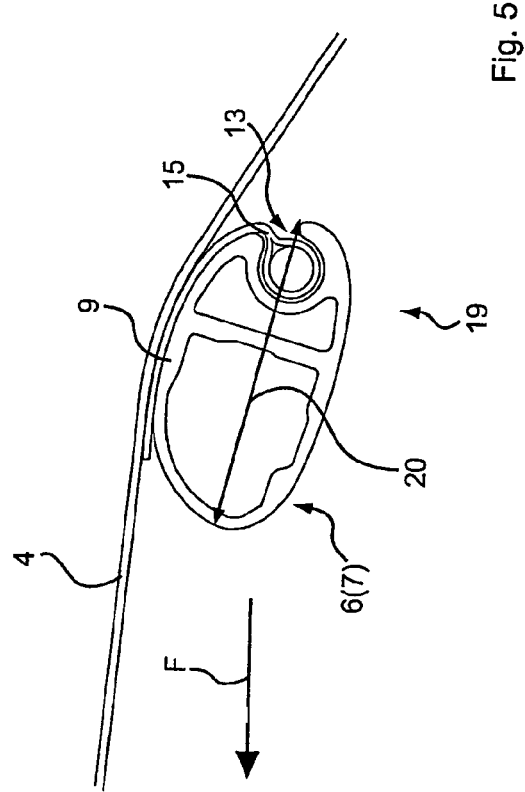

BOW FOR A CONVERTIBLE VEHICLE

BACKGROUND OF THE INVENTION

1. Field of the Invention

The invention concerns a convertible vehicle with a roof, which is at least partially covered with a flexible roof covering, which is supported from below by one or more bows that extend transversely to the direction of vehicle travel, wherein at least one bow is designed with multiple parts and has a middle section that is connected to lateral mounting fixtures.

2. Description of the Related Art

It is well known that in convertible vehicles with flexible roof coverings, e.g., textile or plastic roof coverings, the roof covering can be stretched over bows that extend essentially transversely to the vehicle. In this regard, there are vehicles with multipart bows, which have, for example, a middle section made of a first material and lateral mounting fixtures made of other, e.g., more flexurally stiff, materials, with which the bows are held on lateral frame parts of a roof frame.

If the lateral mounting fixtures and the middle section are screwed together, the heads of the screws extend relatively far into the interior and thus constitute a source of annoyance and a potential hazard to the occupants of the vehicle, especially in the case of low-lying sports cars with little head clearance, or require the installation of a roof-liner, which covers the screw heads but also rubs against them and is thus subject to wear. Moreover, precisely with this type of vehicle it is desirable to design the bows as thin as possible in order to limit the head clearance of the occupants as little as possible. However, this makes it more difficult for the screws to engage firmly, since the thin component can accommodate only a short length of thread.

SUMMARY OF THE INVENTION

The objective of the invention is to optimize the bows in a convertible vehicle with a roof covering that is at least partly flexible and is supported from below by one or more bows.

The invention achieves this objective with a convertible vehicle in which, to connect the middle section to the mounting fixtures, fastening means are provided, which, when the roof is closed, are at least approximately parallel to the plane of the outer roof covering in the area of each bow.

In accordance with the invention, the fastening devices, e.g., screws, bolts, rivets, or the like, do not extend beyond the bow. This increases head clearance and reduces the risk of injury.

The desired thin shape of the bow is actually advantageous for the design of the invention: Especially if the middle section of the bow has an essentially elliptical cross-sectional shape with a major axis at least approximately parallel to the plane of the roof covering in the vicinity of each bow, it is possible to use long fastening means in this plane parallel to the roof covering without these fastening means protruding beyond the outer contour of the bow.

If, as is advantageous, the fastening means can be inserted through a retaining channel and if, in the installed position, they are covered by a recessed roof covering fastener, then they are visually completely concealed, inaccessible to unintentional loosening, and free of projecting edges or corners. A roof liner is unnecessary.

The retaining element channel also makes it possible for the roof covering fastener to be fed laterally into, and removed laterally from, the middle section of the bow. If suitable insertion regions are provided in at least one of the mounting fixtures, this lateral insertion and removal is also possible in an advantageous way even after the bows have been assembled, which simplifies replacement of the roof covering.

Further advantages and features of the invention are explained below with reference to the specific embodiment of the object of the invention that is illustrated in the drawings.

BRIEF DESCRIPTION OF THE DRAWING

FIG. 2 shows an individual bow in an oblique rear view.

FIG. 3 shows the detail III in FIG. 2.

FIG. 4 shows a section along line IV-IV in FIG. 3 with the roof covering and its fastening also shown.

FIG. 5 shows a section along line V-V in FIG. 3 with the roof covering and its fastening also shown.

DETAILED DESCRIPTION OF THE INVENTION

Figure 1:
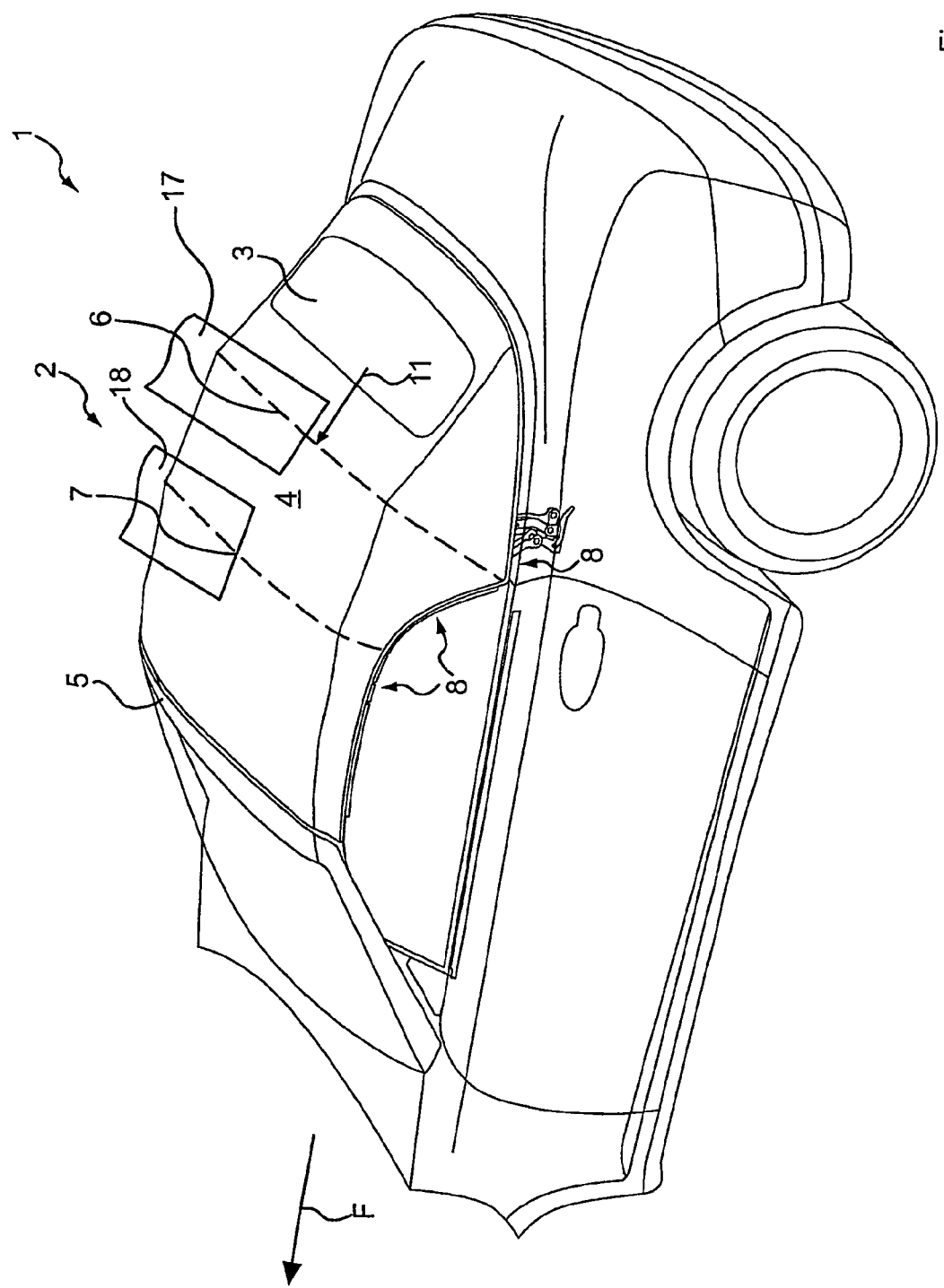
FIG. 1 shows a convertible vehicle in a schematic, perspective view that is broken off at the front and below, with the roof completely closed and with a flexible roof covering that extends over the whole extent of the roof except for the rear window.

The convertible vehicle 1 of the invention can be either a two-seater or a convertible vehicle with a larger interior with, e.g., two rows of seats one behind the other.

It has a movable roof, designated as a whole by reference number 2, and, in the illustrated example, a flexible roof covering 4, that extends over the whole extent of the roof 2 except for the rear window 3. However, this is not required. It would also be possible for only a part of the roof 2 to be flexible and for another part of the roof to be formed by one or more rigid panel sections. In its closed position (FIG. 1), the roof 2 is locked on a windshield frame 5.

To maintain the shape of the roof covering 4, it is supported from below in one or often several places by one or more bows 6, 7, that extend transversely to the direction of vehicle travel F. The bows 6, 7 are in turn secured to lateral frame parts 8 of the roof 2 either rigidly or in a way that allows them to pivot.

For this purpose, each bow 6, 7 comprises a middle section 9, which is made of a first material and is realized, for example, as an extruded aluminum section, and lateral mounting fixtures 10, which are made of a different material, for example, as aluminum sand castings. The mounting fixtures 10 hold the bows 6, 7 on the frame parts 8.

As an example, two bows 6, 7 are shown in possible positions as broken lines in FIG. 1. The view of a single bow 6 in FIG. 2 is seen approximately from the direction of arrow 11 in FIG. 1, i.e., essentially from the rear in the direction of vehicle travel F.

The rear surfaces 12 of the bows 6, 7 are not necessarily exactly perpendicular to the direction of vehicle travel F. Instead, because of the inclination of the bows 6, 7, these surfaces can also be at a certain angle to the horizontal plane, as can be seen especially in the case of bow 6. These rear surfaces have a continuous retaining channel 13. The retaining channel 13 is designed to receive the bead 14 or similar thickened area of a fastener 15 for the roof covering, in this case a patch of material, and has an approximately C-shaped cross section (FIG. 5).

Near the lateral edges, the C-shape widens out (FIG. 4), so that fastening means 16 can be inserted there transversely to the direction in which the retaining channel 13 extends. In the embodiment illustrated here, the fastening means 16 consist of two screws on each side of the vehicle. They pass through the middle section 9 and engage in the ends of the mounting fixture 10, which is retained positively in the middle section 9.

The screws 16 can be self-tapping. No additional means of securing the middle section 9 and the mounting fixtures 10 to each other are required.

In their connected positions, the screws 16 are at least approximately parallel to the planes 17 and 18 of the roof covering 4 in the area of each bow 6, 7 and thus do not project beyond the area 19 of the bow 6, 7 that extends the farthest into the passenger compartment.

The bows 6, 7 have a cross section with an elliptical shape or similarly flattened shape (an almost rectangular or trapezoidal outer contour is another possibility). The major axis 20 of the ellipse is exactly parallel or almost parallel to the plane 17, 18 of the roof covering 4 in the area of each bow 6, 7. The fastening means 16 can thus be inserted in the direction of the major axis 20 of the bow 6, 7 (FIG. 4), so that the fastening means can be long enough to get a good grip with their threads, for example, without having to project beyond the outer contour of each bow 6, 7. As FIG. 4 shows, furthermore, the heads 21 of the screws 16 are recessed so far that they are completely inside the bow 6, 7, where they are also covered by the bead 14 and the patch of material 15 and are thus inaccessible.

The cross sections of the mounting fixtures 10 are adapted to the outer contour of the middle section 9 by providing them with a similarly flattened shape. Therefore, they extend only slightly into the interior of the vehicle, so that here, too, head clearance above and to the side is maximized.

After the assembly of the bows 6, 7, the projecting, thickened bead 14 of the roof covering fastener 15 is fed laterally into the retaining channel 13 along an insertion region 22 located on at least one of the mounting fixtures 10 (shown here on both mounting fixtures). The recessed insertion regions 22 widen towards the longitudinal center plane of the vehicle and thus facilitate the insertion of the roof covering fastener 15. The inserted bead 14 is then held securely in the C-shaped channel 13 and cannot be pulled out (FIG. 5).

At the end opposite the bead 14, the patch of material 15 is securely attached to the outer roof covering 4 by welding or adhesive bonding, for example. A roof liner can be additionally installed (not shown) but is not necessary to cover any fastening means 16.

The invention can be used both in vehicles with a roof 2 that is manually moved and in vehicles with a roof 2 that can be moved fully automatically or semiautomatically.

The invention claimed is:

1. Convertible vehicle (1) with a roof (2), which is at least partially covered with a flexible roof covering (4), which is supported from below by one or more bows (6; 7) that extend transversely to the direction of vehicle travel (F), wherein at least one bow (6; 7) has multiple parts and a middle section (9), further comprising lateral mounting fixtures (10), and fastening means for connecting the middle section (9) to the mounting fixtures (10), wherein when the roof is closed, the fastening means extend parallel to the plane (17; 18) of the outer roof covering (4) while the outer roof covering is supported by at least one bow.

2. Convertible vehicle (1) according to claim 1, wherein the mounting fixtures (10) engage positively with the middle section (9), and the fastening means (16) pass through both parts (9; 10).

3. Convertible vehicle (1) according to claim 1, wherein the middle section (9) has a retaining channel (13), which runs the length of the middle section (9), to hold a thickened bead (14) or similar edge area of a fastener (15) for the roof covering.

4. Convertible vehicle (1) according to claim 3, wherein the fastening means (16) can be inserted through the retaining channel (13) and are covered by the roof covering fastener (15) when in the installed position.

5. Convertible vehicle (1) according to claim 4, wherein at least one of the mounting fixtures (10) has a recessed insertion region (22) leading to the retaining channel (13).

6. Convertible vehicle according to claim 5, wherein the insertion region (22) widens towards the center of the vehicle.

7. Convertible vehicle according to claim 1, wherein the fastening means (16) are screws, the heads (21) of which face the retaining channel (13) when in the installed position.

8. Convertible vehicle according to claim 1, wherein the middle section (9) of the bow (6; 7) has an elliptical cross section with a major axis (20) that is parallel to the plane (17; 18) of the roof covering in the vicinity of each bow (6; 7).

9. Convertible vehicle according to claim 1, wherein the mounting fixture (10) has a flattened shape.

\* \* \* \* \*